United States Patent Office 3,623,412
Patented Nov. 30, 1971

3,623,412
MANUALLY AND AUTOMATICALLY SETTABLE SHUTTER WITH DISENGAGEABLE GOVERNOR
Kiyoshi Kitai, 54 Tomihisa-cho, Shinjuku, Tokyo, Japan
Filed Oct. 24, 1969, Ser. No. 869,256
Claims priority, application Japan, Oct. 24, 1968,
43/77,108
Int. Cl. G03b 7/08, 9/60, 9/62
U.S. Cl. 95—10 C                            9 Claims

ABSTRACT OF THE DISCLOSURE

A camera is provided with a shutter actuating mechanism which is alternatively operable in both an "automatic" mode to control the exposure time in dependence upon the brightness of an object being photographed and a "manual" mode to selectively control the exposure time. A programmed governor mechanism is employed to limit the shutter opening speed when the camera is operating in the "automatic" mode and the governor mechanism is automatically rendered ineffective when the camera is operating in the "manual" mode.

---

The present invention relates to a program-type electric shutter having an "automatic" mode of operation in which the opening operation of a shutter sector is controlled by a governor mechanism and the opening diameter of the shutter sector is varied according to a definite relation. An electric delay circuit containing a photoelectric element is provided for automatically controlling the exposure time in dependence upon the brightness of a photographed body. The shutter is also operable in a "manual" mode whereupon the shutter opening as well as the exposure time are manually selected by the user.

In prior art shutters of the above-mentioned type, a proper exposure was automatically determined according to the brightness of the photographed body without selecting beforehand the iris aperture and exposure time. This was advantageous in that it enabled the camera operator to take photographs easily and properly. However, the combination of the iris aperture and exposure time for the brightness of the body being photographed was definitely set and it was impossible to take photographs by variably selecting an iris aperture and exposure time as desired by the photographer.

Therefore, a primary object of this invention is to provide a program-type electric shutter in which the above defect is eliminated.

A further object of the present invention is to provide a camera having both an "automatic" and a "manual" mode of operation and wherein a governor mechanism is effective to limit the opening speed of the shutter during automatic operation but is rendered ineffective to control the shutter opening speed during manual operation.

A still further object of the present invention is to provide an electric delay circuit having a photoelectric element arranged so as to be changed over to a resistance element affording either an automatic or selected exposure time.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings.

Figure 1:
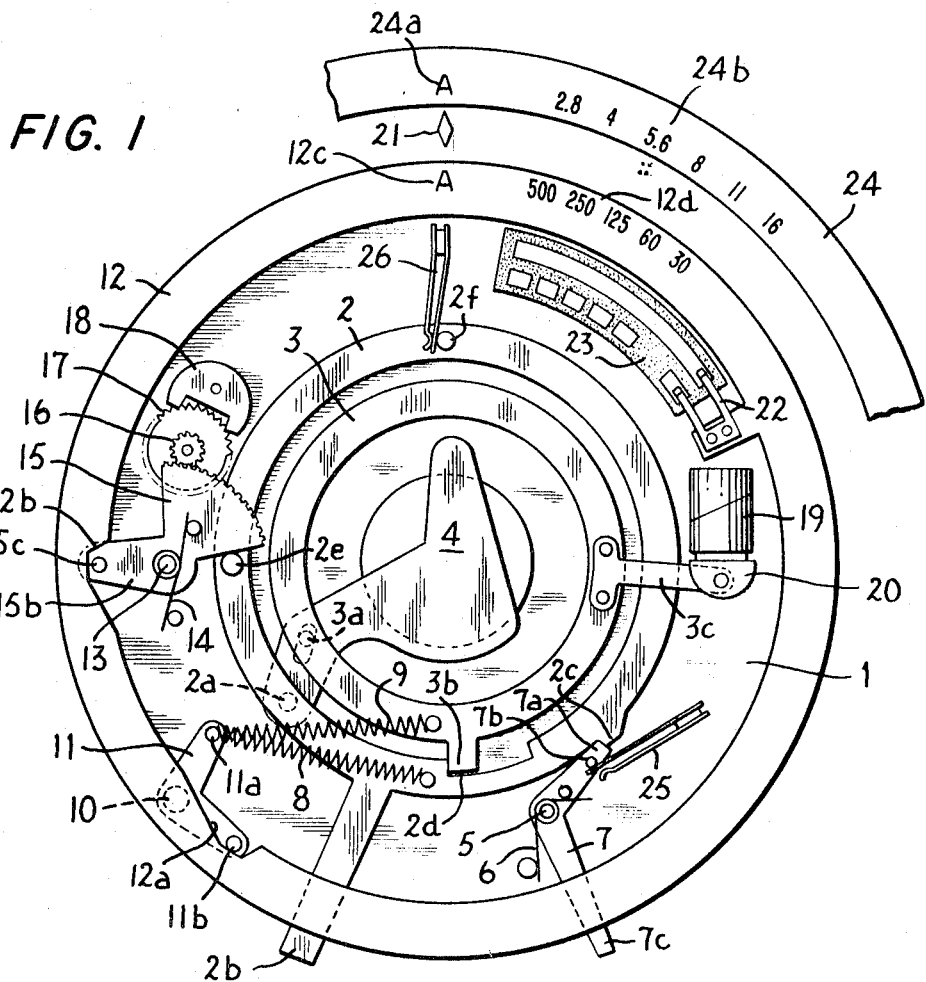
Figure 2:
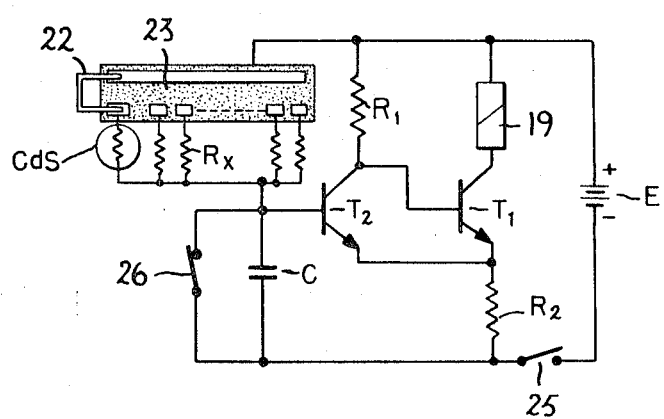

FIG. 1 is a diagrammatic illustration of the switching mechanism of the present invention showing the components in a charged shutter condition; and FIG. 2 is a schematic representation of an electric delay circuit.

DESCRIPTION OF THE PREFERRED EMBODIMENT

A camera is provided with a shutter actuating mechanism which comprises a pair of sector rings 2 and 3 which are rotatably mounted on a base plate 1. The shutter comprises a plurality of shutter sectors 4, only one of which is shown, connected to the sector ring 2 by a pin 2a and connected to the sector 3 by a pin 3a. The pin 3a is slidable in a slot provided in the shutter sector 4 to allow relative movement between the sector rings as well known in the art. Attached to the sector ring 2 is an arm 2b operable to charge or cock the shutter. The sector ring 2 is further provided with a projection 2c which releasably engages with a release lever 7 and a recessed portion 2d which accommodates a projection 3b of the sector ring 3. The release lever 7 is pivotally mounted about a pin 5 and is continuously biased in a counterclockwise direction into engagement with the projection 2c by means of a spring 6.

The sector rings 2 and 3 are biased to undergo clockwise rotation by a pair of springs 8 and 9. The springs 8 and 9 each have one end connected to sector rings 2 and 3, respectively, and their other end connected to a pin 11a which is attached to an L-shaped lever 11 which is pivotally mounted upon a pin 10 connected to the base plate 1. A time-selecting ring 12 is rotatably mounted on the base plate 1 and has a cam surface 12a in caming contact with a pin 11b and the cam surface 12a functions to prevent clockwise rotation of the L-shaped lever 11 whereby the sector rings 2 and 3 are maintained in a charged condition by means of the tension springs 8 and 9 as depicted in FIG. 1.

A governor mechanism is provided for limiting the opening speed of the shutter when the camera is operating in the "automatic" mode of operation. The governor mechanism comprises a tooth sector 15 rotatably mounted on a pin 13 which is attached to the base plate 1. The tooth sector 15 is continuously urged against a pin 2e provided on the sector ring 2 by a spring 14. The tooth sector 15 has an arm 15b which carries a pin 15c. The pin 15c is positioned to be engaged by a cam surface 12b when the camera is operating in the "manual" mode to render the governor mechanism ineffective, as more fully described below. The toothed sector 15 meshes with a pinion 16 which is rotatably mounted on the base plate 1 and the pinion 16 rotatably drives an escape gear 17 which releasably engages with a pivotally mounted anchor 18. During operation of the camera in its "automatic" mode, the opening speed of the shutter is programmed by means of the governor mechanism to be opened at a preselected speed. As the sector ring 2 is rotated in a counterclockwise direction, the pin 2e engages with the toothed sector 15 and pivots the sector in a counterclockwise direction about the pin 13 at a reduced speed imposed by the governor mechanism.

An electromagnet 19 is positioned on the base plate 1 and when energized, attracts thereto a magnetic locking member 20. The magnetic locking member 20 is mounted on an arm 3c which is rigid with the sector ring 3 and moveable therewith. The electromagnet 19 is connected in an electric circuit, as shown in FIG. 2 and functions to initiate the shutter closing as described below.

An indicia 12c is provided on the time-selecting ring 12 and represents the "automatic" mode and an indicia 12b representing various exposure times is provided on the time-selecting ring 12 for use when the camera is operated in the "manual" mode. An iris aperture selecting ring 24 is rotatably mounted on the camera body and functions in a well known manner to operate an iris mechanism (not shown) and has an indicia 24a representative of the "automatic" mode and an indicia 24b representative of various iris aperture openings for use when the camera is operated in the "manual" mode. It should be noted that when the iris aperture selecting ring 24 is positioned as shown in FIG. 1, i.e., for "automatic" mode of operation, the iris aperture has its maximum opening.

Positioned on the base plate 1 is a switch plate 23 having a plurality of spaced apart electrodes which are positioned to be selectively brought into electrical contact with one arm of a sliding contact 22 and an elongated electrode which is continuously in electrical contact with the other arm of the sliding contact 22. Each spaced apart electrode is connected to a resistor having a predetermined resistance chosen in accordance with the desired exposure time indicated by the indicia 12d. As the time-selecting ring 12 is rotated in a counterclockwise direction to position one of the exposure times represented by the indicia 12d beneath the fixed index 21, the sliding contact 22 places the corresponding resistor $R_x$ into the delay circuit shown in FIG. 2. When the camera is operated in the "automatic" mode, the sliding contact 22 places a photoelectric cell, such as a CdS cell, in the delay circuit to control the exposure time in dependence upon the brightness of the particular objects being photographed, as well known in the art.

A normally opened electric source switch 25 is mounted on the base plate 1 and is actuated by a pin 7b, which is connected to the release lever 7, when the release lever 7 is pivoted in a clockwise direction. Also mounted on the base plate 1 is a normally closed timing switch 26 which is actuated to its open position by means of a pin 2f provided on the sector ring 2.

FIG. 2 is a wiring diagram of an electric delay circuit for use in the camera of the present invention and the delay circuit itself is of a type which is well known in the art. The sliding contact 22 on the switching plate 23 is connected in series with the normally closed timing switch 26 and the normally opened source switch 25 and a source of electric energy E. In series with the source switch 25 is a resistor $R_2$, a transistor $T_1$ and the electromagnet 19 which is connected to the positive pole of the electric energy source E. Another transistor $T_2$ has its collector connected to both the base of the transistor $T_1$ and the positive pole of the source E through a resistance $R_1$. The emitters of both transistors are connected to one end of the source switch 25 through the resistance $R_2$. A condenser C is connected in parallel with the timing switch 26. Connected on the switch plate 23 are the photoelectric cell CdS for automatically controlling the exposure time and a bank of resistances $R_x$ each having a different ohmic value preselected in accodance with the various exposure times represented by the indicia 12d for manually selecting the exposure time.

The "automatic" mode of operation will now be described. Assuming that the shutter is charged and that the iris aperture selecting ring 24 and the time-selecting ring 12 are both positioned as shown in FIG. 1, the camera is ready to be operated in its "automatic" mode. When the release lever 7 is tripped, the electric source switch 25 is closed thereby allowing current flow through the electromagnet 19 to energize the electromagnet thereby creating a magnetic field sufficient to attract and hold the movable piece 20. As the release lever 7 is further pivoted or tripped in a clockwise direction, the arm 7a disengages from the projection 2c of the sector ring 2 thereby allowing the sector ring 2 to rotate in a clockwise direction due to the force exerted thereon by the tension spring 8 to thereby open the shutter sector 4. The speed of movement of the sector ring 2 is limited by the governor mechanism so that the shutter sector 4 is made to open at a relatively slow speed. As the sector ring 2 begins to rotate, the timing switch 26 is thereby opened and the condenser C begins to charge through the photoelectric cell. As the condenser C is charged, a current flows through the transistor $T_2$ and due to the feed back between the transistors $T_1$ and $T_2$, the current flow through transistor $T_2$ rapidly increases while the current through transistor $T_1$ is dimensioned to zero. As a result, the magnetic field created by the electromagnet 19 is extinguished whereupon the magnetic piece 20 is no longer attracted or held to the electromagnet and the sector ring 3 is rapidly rotated in a clockwise direction by the tension spring 9. Since the speed of rotation of the sector ring 3 is not impeded by the governor mechanism, the closing speed of the sector ring 3 is much greater than the opening speed of the sector ring 2 whereby the shutter sector 4 is rapidly closed. Hence, in the "automatic" mode of operation, the opening diameter of the shutter and the exposure time are simultaneously controlled in dependence upon the brightness of the object being photographed.

In comparison, the "manual" mode of operation will now be described. Assuming that the user desires an exposure time of 1/250 second and an iris aperture of F 5.6, the time-selecting ring 12 is rotated in a counterclockwise direction until the number "250" is beneath the fixed index 21 and the iris aperture selecting ring 24 is rotated in a counterclockwise direction until the number "5.6" is above the fixed index 21. As the time-selecting ring 12 is rotated in a counterclockwise direction, the camming surface 12b engages with the pin 15c and pivots the toothed sector 15 in a counterclockwise direction out of engagement with the pin 2e of the sector ring 2. Thus, it can be seen that as the camera is shifted into its "manual" mode of operation, the governor mechanism is rendered ineffective to control the speed of opening of shutter actuating mechanism. As the time-selecting ring 12 is rotated in a counterclockwise direction, the sliding contact 22 slides along the switch plate 23 and places the appropriate resistance $R_x$ in the electric delay circuit.

As the release lever 7 is tripped, the source switch 25 is first closed to energize the electromagnet 19 thereby creating a magnetic field sufficient to hold the magnetic piece 20 in place and as the sector ring 2 rotates, the timing switch 26 is opened. The operation, up to this time, is the same as when the camera was operating in the "automatic" mode of operation with the exception that the speed of movement of the sector ring 2 is not affected by the limiting action of the governor mechanism whereupon the opening speed of the shutter sector 4 is very rapid. It should be noted that as the time-selecting ring 12 is rotated in a counterclockwise direction, the L-shaped lever is pivoted in a counterclockwise direction and the tension in the springs 8 and 9 is slightly increased with the attendant result that the opening and closing speed of the sector rings 2 and 3 are increased. The charging of the condenser C proceeds through the resistance $R_x$ corresponding to the exposure time 1/250 second, and when a current begins to flow through the transistor $T_2$, current flow through the transistor $T_1$ is stopped and the electromagnet 19 is demagnetized thereby allowing the sector ring 3 to rotate in a counterclockwise direction to close the shutter sector 4. As aforementioned, the increased tension in the spring 9 is effective to close the shutter sector 4 at a more rapid rate than was achieved in the "automatic" mode of operation.

The concept of the present invention could just as well be carried out by rendering the governor mechanism ineffective as a consequence of the motion of the iris aperture selecting ring 24. Likewise, the spring forces in the springs 8 and 9 could be made dependent upon the motion of the iris aperture selecting ring 24 or, the spring forces could be maintained the same for either mode of operation. In addition, the actual driving of the shutter sector 4 could be performed by any other known manner of operation without departing from the concept of the present invention.

What I claim and desire to secure by Letters Patent is:

1. In a camera having a shutter; a shutter actuating mechanism alternatively operable in both an "automatic" mode to effect opening of said shutter for a time duration dependent upon the brightness of an object being photographed and a "manual" mode to effect opening of said shutter for a time duration manually selected by the user; means for limiting the opening speed of said shutter when said shutter actuating mechanism is operating in said "automatic" mode; and means responsive to the shifting of said shutter actuating mechanism to said "manual" mode for rendering said last-mentioned means ineffective.

2. A camera according to claim 1; wherein said means for limiting the opening speed of said shutter comprises a pivotally mounted toothed sector releasably engaged with said shutter actuating mechanism; and a toothed speed-limiting mechanism in mesh with said toothed sector operative to limit the speed of pivotal movement of said toothed sector when said shutter actuating mechanism is operating in said "automatic" mode.

3. A camera according to claim 2; wherein said means responsive to the shifting of said shutter actuating mechanism comprises a rotatably mounted ring; and a cam on said ring operative to pivot said toothed sector out of engagement with said shutter actuating mechanism in response to rotational movement of said ring.

4. A camera according to claim 1; including an electric delay circuit cooperative with said shutter actuating mechanism to control the open period of said shutter; said electric delay circuit including light responsive means operable when said shutter actuating mechanism is operating in said "automatic" mode for automatically determining the shutter open period in dependence upon the brightness of an object being photographed and manually selectable means operable when said shutter actuating mechanism is operating in said "manual" mode for selectively determining the shutter open period.

5. A camera according to claim 4; wherein said manually selectable means comprises a plurality of resistors each having an ohmic value corresponding to a predetermined exposure time; and a rotatably mounted mode selecting ring movable to place said camera in either said "automatic" or "manual" mode of operation; an electrical contact on said mode selecting ring operative to place selective ones of said resistors in said electric delay circuit in response to rotational movement of said ring.

6. A camera according to claim 5; wherein said means for limiting the opening speed of said shutter comprises a pivotally mounted toothed sector releasably engaged with said shutter actuating mechanism; and a toothed speed-limiting mechanism in mesh with said toothed sector operative to limit the speed of pivotal movement of said toothed sector when said shutter actuating mechanism is operating in said "automatic" mode.

7. A camera according to claim 6; wherein said means responsive to the shifting of said shutter actuating mechanism comprises said mode selecting ring; and a cam on said ring operative to pivot said toothed sector out of engagement with said shutter actuating mechanism in response to rotational movement of said ring.

8. A camera according to claim 5; wherein said shutter actuating mechanism comprises a pair of rotatably mounted sector rings cooperative with said shutter to effect opening and closing thereof; and means operative in response to rotational movement of said mode selecting ring to effect closing of said shutter at a greater speed when said camera is operating in said "automatic" mode than when operating in said "manual" mode.

9. A camera according to claim 8; including a pivotally mounted lever, a cam follower positioned on said lever; spring means connected to an end of said lever for continuously urging said sector rings in one angular direction; and a cam on said mode selecting ring in camming contact with said cam follower operative to pivot said lever and thereby increase the tension in said spring means in response to rotational movement of said mode selecting ring.

References Cited

UNITED STATES PATENTS

| | | | |
|---|---|---|---|
| 3,083,629 | 4/1963 | Kiper | 95—63 |
| 3,460,451 | 8/1969 | Starp et al. | 95—10 C |
| 3,468,237 | 9/1969 | Cotta et al. | 95—63 |

SAMUEL S. MATTHEWS, Primary Examiner

M. L. GELLNER, Assistant Examiner

U.S. Cl. X.R.

95—63